US005086302A

United States Patent [19]

Miller

[11] Patent Number: 5,086,302

[45] Date of Patent: Feb. 4, 1992

[54] FAULT ISOLATION IN A BUTLER MATRIX FED CIRCULAR PHASED ARRAY ANTENNA

[75] Inventor: George M. Miller, Parkton, Md.

[73] Assignee: Allied-Signal Inc., Morris County, N.J.

[21] Appl. No.: 683,469

[22] Filed: Apr. 10, 1991

[51] Int. Cl.$^5$ .......................... H01Q 3/22; G01S 7/40

[52] U.S. Cl. ...................................... 342/373; 342/173

[58] Field of Search ......................... 342/373, 173, 371

[56] References Cited

U.S. PATENT DOCUMENTS 4,176,354 11/1979 Hsiao et al. ........................ 342/173

4,639,732 1/1987 Acoraci et al. ..................... 342/371

*Primary Examiner*—Gregory C. Issing

*Attorney, Agent, or Firm*—Howard G. Massung; Robert A. Walsh

[57] ABSTRACT

A method for monitoring a phased array antenna system to determine the existence of faulty components in the system and the location of such components in the system. More particularly, the invention relates to a Butler matrix-fed circular phased array antenna system wherein an individual one of the plurality of columns of the array which is faulty can be identified by comparison of a measured amplitude value to a predetermined level.

5 Claims, 4 Drawing Sheets

| | A | B |
|---|---|---|
| Δ | 0 | -180 |
| Σ | 0 | 0 |

FAULT ISOLATION IN A BUTLER MATRIX FED CIRCULAR PHASED ARRAY ANTENNA

The present invention relates to a method and means for monitoring a phased array antenna system to determine the existence of faulty components in the system and the location of such components in the system. More particularly, it relates to a method and means for monitoring a phased array antenna system comprised of a plurality of columns of radiating elements, which is capable of identifying an individual one of the plurality of columns that contains a faulty component.

BACKGROUND OF THE INVENTION

A specific application of the invention is in the monitoring of a Butler matrix-fed circular phased array antenna system. A general description of a circular phased array antenna system and the theory of operation thereof is contained in a paper titled: "A Matrix-Fed Circular Array for Continuous Scanning" by B. Sheleg, Proc. IEEE, V. 56, no. 11, (Nov. 1968). The Sheleg reference makes no mention of a monitoring system for such an antenna.

This invention is an improvement upon the monitoring system disclosed in U.S. Pat. No. 4,639,732, issued Jan. 27, 1987, to J. Acoraci and A. Moeller for "Integral Monitoring System for Circular Phased Array Antenna", and assigned to the assignee of the present invention.

The circular phased array antenna described in the Acoraci et al. patent comprises sixty-four pairs of dipole radiating elements, with the dipole pairs arranged vertically and evenly spaced about the circumference of a cylindrical ground plane. Each dipole pair is fed energy from one of sixty-four output ports of a Butler-type beam forming matrix. The antenna system further includes a plurality of digital phase shifters, one for each excited input mode of the Butler matrix, which permit fine steering of the array beam to any selected one of 1024 evenly spaced azimuth radials.

The monitoring system disclosed in the Acoraci et al. patent utilizes four independent monitor signal circuits, one for each of the four quadrants, which are spaced around the circumference of the array. Each monitor signal circuit includes an r.f. monitor assembly which spans one-quarter of the circumference of the array. Each r.f. monitor assembly includes sixteen probes, one for each of the dipole pairs in a quadrant of the array, that are each connected to a common transmission line through individual fixed phase shifters and couplers. Each of the probes is located in near proximity to a dipole pair. The fixed phase shifters and couplers associated with the probes are so designed that the signal output from the common transmission line simulates the signal that would be received by an antenna positioned in the far field of the array along the 45° radial of the quadrant covered by the r.f. monitor assembly.

The monitoring system of Acoraci et al. operates during the normal transmit mode of the antenna system. As the beam of the array is scanned in azimuth, the amplitude of the signal output of the monitor circuit for the quadrant in which the beam is then located is compared with stored values of signal output previously obtained from a fully functional array. Such a comparison is made at each of the 256 beam positions within a quadrant. If the comparison shows a departure in the signal output by more than a tolerable amount at one or more of the beam positions within a quadrant, a fault signal is generated, indicating a failure at one or more of the sixteen dipole pairs within that quadrant. It is then necessary, using other procedures, to test individually each of the dipole pairs of that quadrant to identify the particular one or ones of the dipole pairs at fault.

It is an object of the present invention to provide a method and means for monitoring a phased array antenna system to provide a warning of the presence of faulty components in the radiating elements of the antenna system.

It is a more particular object of the invention to provide a method and means for monitoring a circular phased array antenna system comprised of a plurality of columns of radiating elements to provide a warning of the presence of faulty radiating columns in the system and to provide an indication of the particular one or ones of such columns at fault.

Other objects and advantages of the invention will become evident as an understanding thereof is gained from the following complete description and the accompanying drawings.

SUMMARY OF THE INVENTION

Briefly, the present invention comprises a method and means for monitoring a Butler matrix-fed circular phased array antenna system having a plurality of columns of radiating elements spaced about the circumference of a cylindrical ground plane. The antenna system includes a power divider, a plurality of variable phase shifters and a Butler matrix which cooperate in forming a pencil beam that may be steered through 360° of azimuth. The antenna system further includes a transmitter and a monopulse receiver that are coupled through the power divider for radiating signals during transmission and for detecting return signals from a radar target during reception.

The means of the invention include a plurality of independent r.f. monitor assemblies, similar to the r.f. monitor assemblies of the referenced Acoraci et al. patent, mounted medially about the circumference of the array. The monitor assemblies are distributed in evenly spaced sectors about the circumference of the array and each monitor assembly is of a length sufficient to span the aperture of a group of columns of radiating elements. During normal operation, the phase shifters of the antenna system are set to particular predetermined values to establish a pencil beam at a selected azimuth angle.

At the beginning of a monitor cycle, the phase shifters of the antenna system are set to a second set of predetermined values to establish an antenna beam in which only a single selected one of the columns of radiating elements of the array is effective in furnishing signal to the system receiver. The azimuth angle selected is the one that corresponds to an azimuth radial through the selected column. Resetting the phase shifters to such second values causes all of the radiating columns, except the selected one, to be inert. A test signal is then applied to the monitor assembly associated with the selected one of the columns and the amplitude of the signal detected by the receiver is measured and compared with a stored signal value obtained under similar conditions when the selected column was known to be fully functional. If there is a failure in the selected column, e.g.,an open circuit or a short circuit, the measured amplitude will be less than the stored reference amplitude by approximately 9 db. A fault in the selected one of the columns is then flagged. The phase shifters are readjusted to select another column within a sector covered by a particular monitor assembly and the test is repeated, and so on, until all columns within that sector are tested. Then, the test signal is switched to excite the monitor assembly of another sector and all columns within the sector are tested successively in like manner, until all columns of the array are tested and faulty columns are identified. Each of the columns of the array are tested individually and rapidly and any faulty column in each of the sectors is immediately identified. It is not necessary to resort to other methods to identify the particular radiating element at fault within a sector after a fault warning is given, as is the case in the above-referenced Acoraci et al. monitor system.

DETAILED DESCRIPTION OF THE INVENTION

Figure 1:
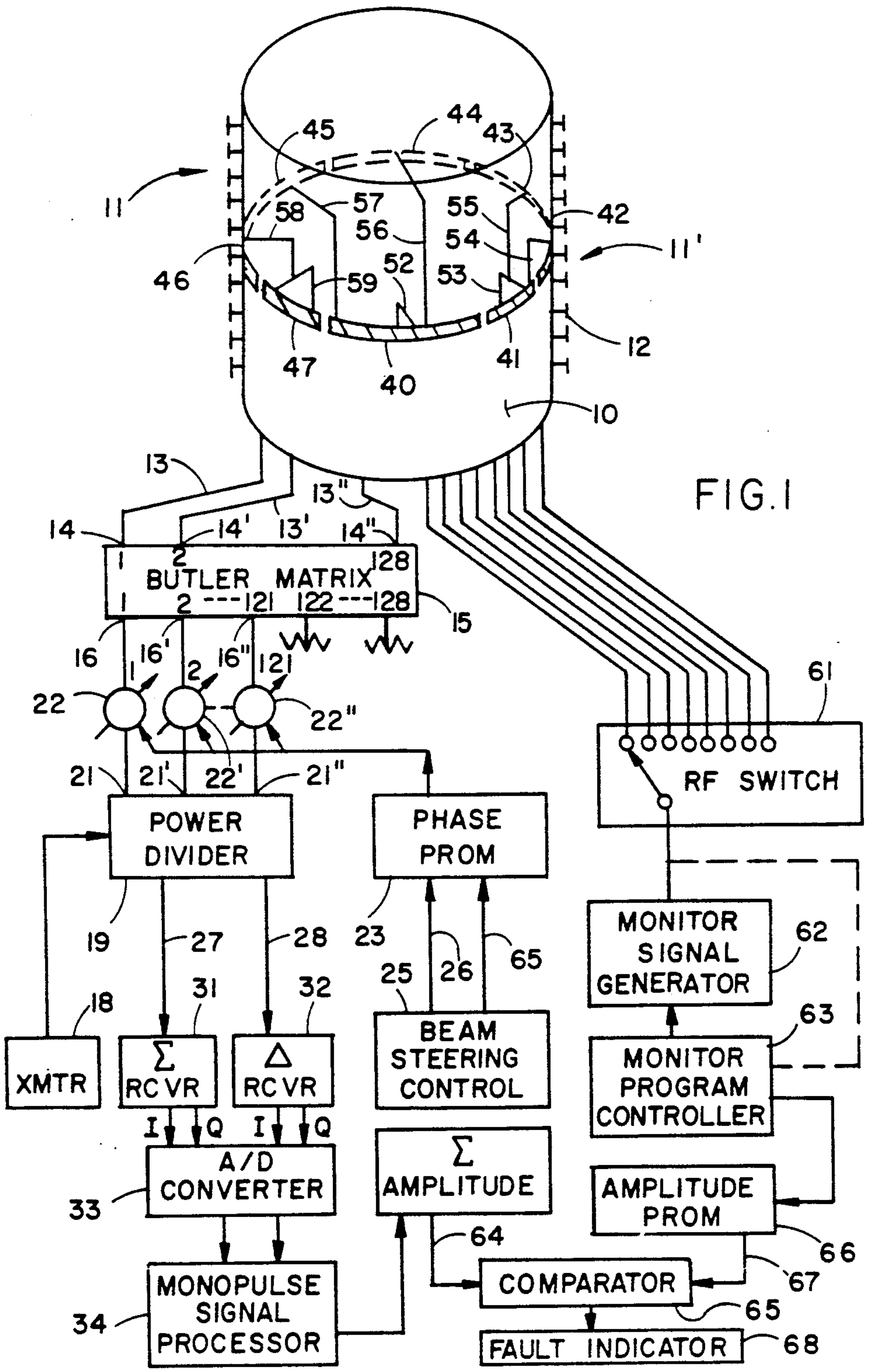
FIG. 1 is a functional block diagram of a Butler matrix fed circular phased array antenna incorporating the monitor system of the invention.

FIG. 1 is a functional diagram of a Butler matrix-fed circular phased array antenna system incorporating the monitor system of the invention. The antenna system comprises a cylindrical ground plane 10 upon which are arranged 128 columns 11, 11' of radiating elements 12, only two columns of which are shown for clarity. The columns 11 are evenly spaced about the circumference of the ground plane 10, with each column consisting of ten vertically stacked dipole radiating elements 12. Each of the columns 11 comprises an individual subarray which includes an individual corporate feed, couplers and phase shifters (not shown). The corporate feed receives energy through a single input port and distributes the energy through the couplers and phase shifters to the dipoles 12 of the column. The coupling factors and phase shifts of a column are selected to provide a desired beam shape in the elevation plane of the antenna. The columns 11 can each be considered as a single radiating element in the analysis of the azimuth beam pattern of the array.

Each input port of a column corporate feed is supplied energy through one of 128 separate transmission lines 13, 13', 13'' connected to one of 128 output modes 14, 14', 14'' of a Butler matrix 15, known per se in the art. Butler matrix 15 includes 128 input modes 16, 16', 16'', only 121 of which are used in the specific antenna system being described. In the transmit mode, power from a transmitter 18 is supplied to a power divider 19 for distribution to the 121 power divider output ports 21, 21', 21''. Each of the power divider output ports 21, 21' is connected to a separate one of the input modes 16, 16', 16'' of Butler matrix 15 through a variable phase shifter 22, 22', 22''. As is conventional, power divider 19 is designed to distribute the input power unequally between the power divider output ports 21 to provide a particular amplitude taper to the input modes of the Butler matrix for the purpose of shaping the antenna beam. The phase shifters 21, 21', 21'' are adjusted to provide particular predetermined values of phase shift at each of the input modes 16, 16', 16'' of Butler matrix 15 to select discrete angles of the beam pointing direction in azimuth. The predetermined values of phase shifter settings are contained in look-up tables stored in a programmable read only memory (PROM) 23. Beam steering control 25, through control line 26, selects the appropriate look-up table of PROM 23 for application to the phase shifters to provide the desired beam pointing direction. More particularly, the 128 dipole columns 11 are spaced at intervals of 2.8125° about the circumference of the array. Phase shifters 22–22'' may each be adjusted as required to provide thirty two beam positions within the 2.8125° interval between the columns 11. Thus, the array beam may be steered to any one of 4096 positions in 360° of azimuth and PROM 23 contains a separate look-up table for each of the beam positions.

For monopulse reception, the antenna beam is formed just as in the transmit mode of operation, with the beam pointing direction being determined by the particular settings of the phase shifters 22, 22', 22''. Return signals from a radar target are focused by the antenna into a sum (Σ) beam pattern and into a difference (Δ) beam pattern that are applied, respectively, through power divider output lines 27 and 28 to a sum (Σ) receiver 31 and to a difference (Δ) receiver 32. The video outputs of receivers 31 and 32 are supplied as in-phase (I) and quadrature (Q) components to an A/D converter 33 for conversion from analog to digital form and then applied to a monopulse signal processor 34 for determination of the bearing of the radar target from the antenna.

The antenna system as thus far described is entirely conventional. The monitor means of the invention will next be described with reference to FIGS. 1 and 2.

Figure 2:
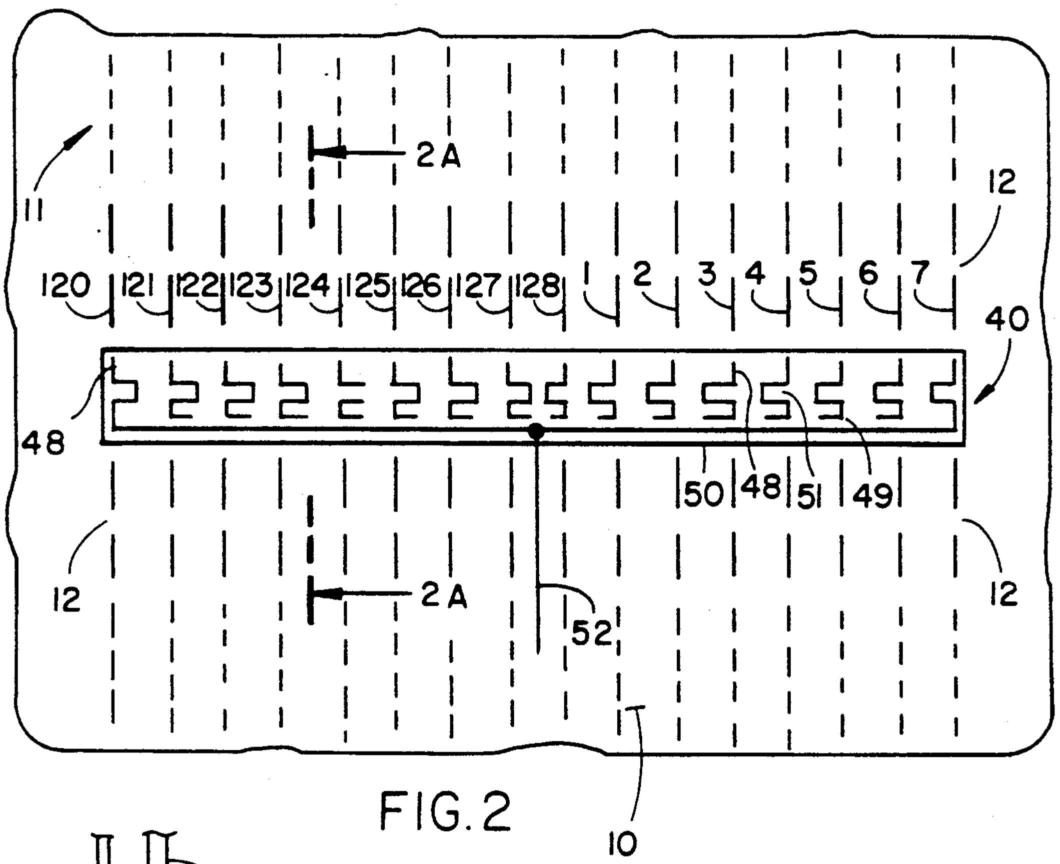
FIG. 2 is a fragmentary elevation of one sector of the array antenna showing the r.f. monitor assembly in schematic form.
Figure 2A:
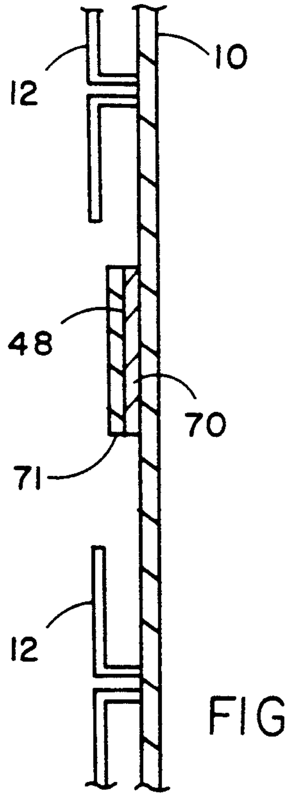
FIG. 2A is a sectional view taken along the line 2A—2A of FIG. 2.

Eight r.f. monitor assemblies 40–47 are positioned medially and evenly spaced about the circumference of the of the antenna array. FIGS. 2 and 2A illustrate a typical one, 40, of the r.f. monitor assemblies 40–47. Each of the monitor assemblies includes sixteen radiating elements 48, each of which extends parallel to the longitudinal axis of one of the columns 11. Each of the monitor assemblies spans a sector of the array that includes sixteen of the columns 11. Monitor assembly 40 is centered on the sector that includes column numbers 120–7. The radiating elements 48 of monitor assembly 40 are combined through a corporate feed structure that includes a transmission line 50, couplers 49 and fixed phase shifters 51 so as to receive proportioned amounts of energy from a single input port connected to transmission line 52 and focus such energy into a beam aligned with the columns 11 of the sector spanned by the monitor assembly. The couplers 49 may suitably be either directional couplers or Wilkinson-type power dividers.

Figure 2B:
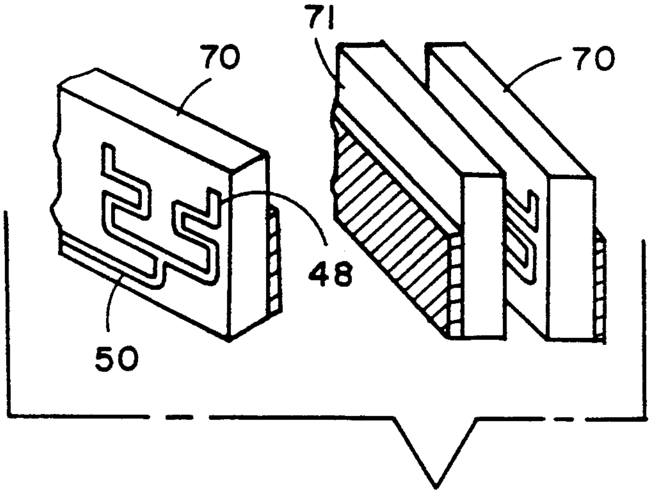
FIG. 2B is a fragmentary isometric view of the r.f. monitor assembly shown in FIGS. 2 and 2A.

As best seen in FIGS. 2A and 2B, the monitor assemblies 40–47 are preferably constructed as printed circuits on the front surface of an insulating board 70, the rear surface of which is clad with metal foil. A second insulating board 71 having a metal clad front surface is superimposed on the lower portion of board 70, upon which are printed the phase shifters 51, couplers 49 and transmission line 50, so as to leave only the elements 48 exposed for radiation.

The transmission lines 52–59 of assemblies 40–47 are connected through an eight position, single pole, r.f. switch 61 to the output of a monitor signal generator 62 to receive a test signal sequentially, as directed by monitor program controller 63.

At the beginning of a test cycle, monitor program controller positions switch 61 to select a particular one of monitor assemblies 40–47 for energization. Then beam steering control 25 is directed to reconfigure phase shifters 20–22″ so that only a selected one of the columns 11 within the selected sector is activated while all the other columns of the array are inert. Monitor signal generator 62 supplies a test pulse through switch 61 to the selected monitor assembly and the amplitude of the signal detected by sum receiver 31, digitized by A/D converter 33, is computed by monopulse signal processor 34 and applied as one input 64 to an amplitude comparator 65. Simultaneously with the application of the digitized sum receiver amplitude to input 65, controller 63 commands a PROM 66 to supply as a second input 67 to comparator 65 a stored digitized amplitude signal for the selected column under test. The stored digitized amplitude signal from PROM 66 is the amplitude of the output of sum receiver 31 obtained under similar test conditions when the selected one of the columns was known to have been fully functional. If comparator 65 determines that the amplitude of input 64 is 9 db or more below the amplitude of input 67, the column selected for test is identified as being faulty in a suitable fault indicator 68. The monitor program controller 62 then directs the beam steering control 25 to adjust phase shifters 22–22″ so that another column within the selected sector becomes active and the test steps are repeated. When all columns within the first selected sector are tested, the monitor program controller 62 changes the position of 61 to select another sector for test and the routine for testing the columns within that sector is repeated. The process continues until all of the columns in the array are tested.

To simplify explanation of the procedures of the invention, the monitoring method will be described as applied to a Butler matrix-fed circular phased array antenna consisting of eight radiating elements.

Figure 3:
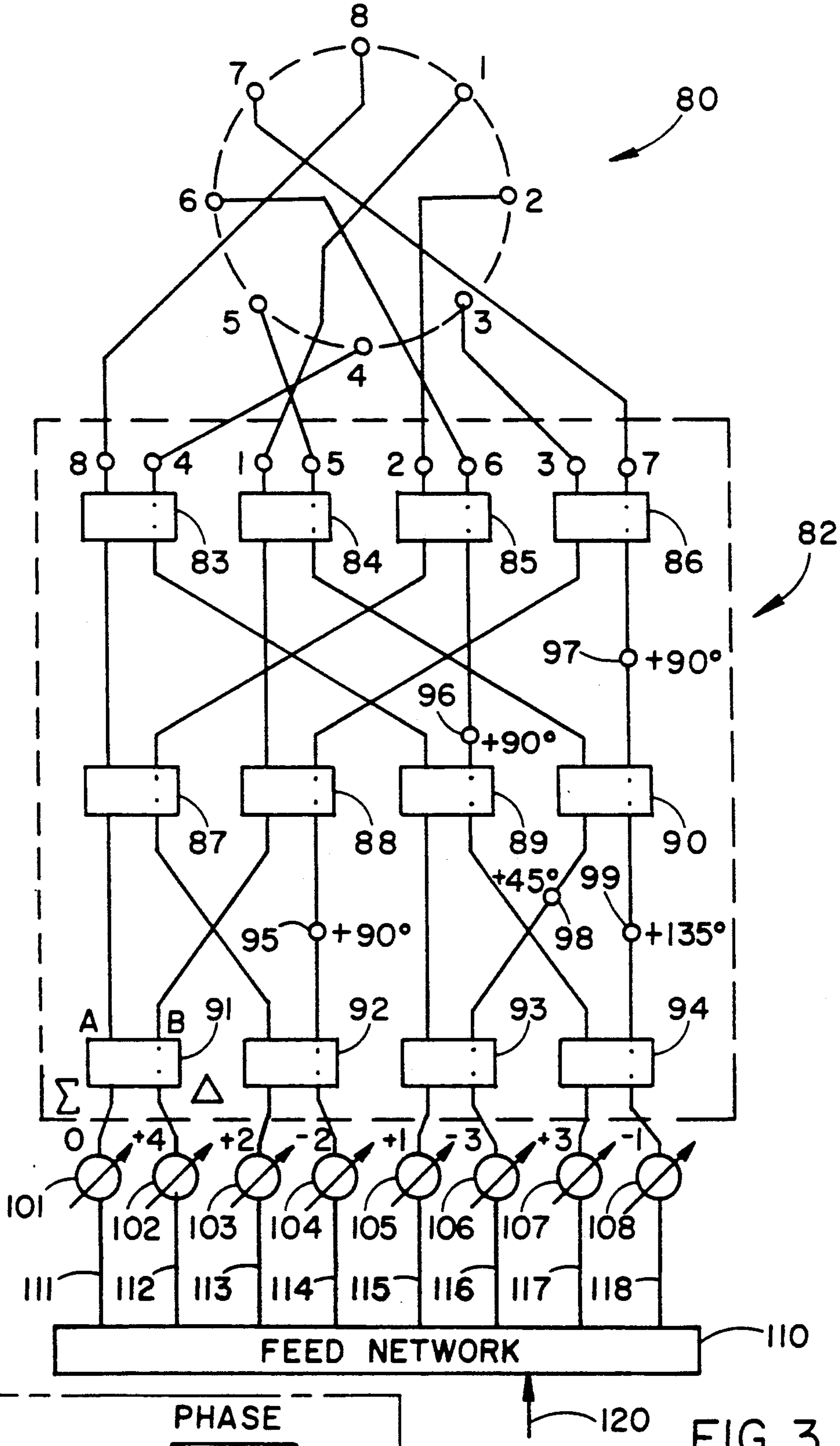
FIG. 3 is a schematic diagram of a Butler matrix fed circular phased array antenna having eight radiating elements.
Figure 3A:
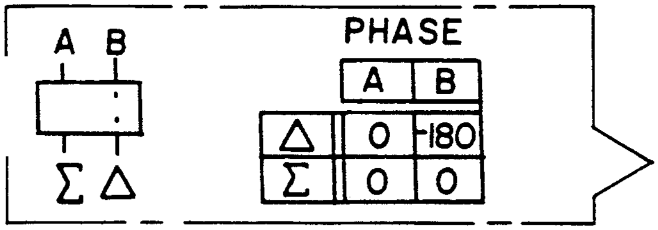
FIG. 3A is a diagram showing the convention used for the coupler symbols of FIG. 3.

FIG. 3 illustrates schematically a circular phased array antenna 80 comprised of eight radiating elements 1–8 evenly spaced about the circumference of a circle. The elements 1–8 of the array are individually fed from output ports 1–8, respectively, of a Butler matrix 82. Matrix 82 includes three rows of 3 db, 180° hybrid couplers 83–94, with each row containing four such couplers. FIG. 3A shows the convention used in FIG. 3 for the symbols representing the couplers 83–94. A signal applied the Σ input of a coupler will divide equally in power between outputs A and B without change in phase. A signal applied to the Δ input of a coupler will divide equally in power between outputs A and B with the output at A appearing in phase with the signal at Δ and the output at B appearing at −180° phase with respect to the signal at Δ.

Again referring to FIG. 3, fixed +90° phase shifters 95–97 are respectively inserted in the lines connecting the B output of coupler 92 with the Δ input of coupler 88, the B output of coupler 89 with the Δ input of coupler 85, and the B output of coupler 90 with the Δ input of coupler 86. A fixed +45° phase shifter 98 is inserted in the line connecting the B output of coupler 93 with the Σ input of coupler 90 and a fixed +135° phase shifter 99 is inserted in the line connecting the B output of coupler 94 with the Δ input of coupler 90. A variable phase shifter 101–108 is connected to each of the input modes 0, +1 to +4, and −1 to −3, of Butler matrix 82. A feed network 110 distributes energy received at an input port 120 between the inputs 111–118 of the phase shifters 101–108. For present purposes, it is assumed that feed network 110 divides the energy received at input port 120 equally between phase shifters 101–108.

With couplers 83–94 interconnected as shown in FIG. 3, and with phase shifters 101–108 all set to zero, energy applied to input port 120 will be distributed with equal amplitudes to each of the radiating elements 1–8 of the array 80 and with the phases, relative to the phase of the signal at element 8, as shown in Table I, below.

TABLE I

| Input | Relative Phase at Matrix Output Port — Element No. | | | | | | | |
|---|---|---|---|---|---|---|---|---|
| Mode | 8 | 1 | 2 | 3 | 4 | 5 | 6 | 7 |
| 0 | 0 | 0 | 0 | 0 | 0 | 0 | 0 | 0 |
| −1 | 0 | −45 | −90 | −135 | 180 | 135 | 90 | 45 |
| −2 | 0 | −90 | 180 | 90 | 0 | −90 | 180 | 90 |
| −3 | 0 | −135 | 90 | −45 | 180 | 45 | −90 | 135 |
| +4 | 0 | 180 | 0 | 180 | 0 | 180 | 0 | 180 |
| +3 | 0 | 135 | −90 | 45 | 180 | −45 | 90 | −135 |
| +2 | 0 | 90 | 180 | −90 | 0 | 90 | 180 | −90 |
| +1 | 0 | 45 | 90 | 135 | 180 | −135 | −90 | −45 |

To form a pencil beam in the far field, calibration phases are inserted at the input modes of Butler matrix 82. The calibration phases are usually obtained empirically. Column B of Table II, below, shows typical values of the calibration phases for an eight element array. The beam is steered desired a azimuth bearing by inserting steering phases at the input modes of the Butler matrix.

During normal operation of the array for transmission and reception, phase shifters 101–108 are each set to the sum of the calibration phase and steering phase indicated for the matrix input mode which the phase shifters respectively serve.

For operation during a monitor cycle, the calibration phases for each of the input modes of the Butler matrix are set to zero. A particular radiating element of the array is selected for isolation for test by setting the phase shifter at each respective matrix input mode to the conjugate of the phase which would appear at the selected radiating element when that respective input mode of the matrix is excited with zero degrees phase.

Below are tables showing the phases and phase shifter settings at the matrix input modes and the relative phases at the array radiating elements for two examples of the operation of the invention. For the first example, Table II-A shows the various phases for the formation of a pencil beam centered on element no. 8, i.e., at 0° azimuth; and Table II-B shows the various phases for isolation of element no. 8 for test. For the second example, Table III-A shows the various phases for the formation of a pencil beam centered on element no. 1, i.e., at 45° azimuth; and Table III-B shows the various phases for isolation of element no. 1 for test.

TABLE II-A

| | | | | Relative Phase Element No. | | | |
|---|---|---|---|---|---|---|---|
| A | B | C | D | 8 | 1 | 2 | 3 |
| 0 | 0.0 | 0.0 | 0.0 | 0.0 | 0.0 | 0.0 | 0.0 |
| −1 | −0.7 | 0.0 | −0.7 | −0.7 | −45.7 | −90.7 | −135.7 |
| −2 | −23.4 | 0.0 | −23.4 | −23.4 | −113.4 | 156.6 | 66.6 |
| 3 | −97.8 | 0.0 | −97.8 | −97.8 | 127.2 | −7.8 | −142.8 |
| +4 | −154.3 | 0.0 | −154.3 | −154.3 | 25.7 | −154.3 | 25.7 |
| +3 | −97.8 | 0.0 | −97.8 | −97.8 | 37.2 | 172.2 | −52.8 |
| +2 | −23.4 | 0.0 | −23.4 | −23.4 | 66.6 | 156.6 | −113.4 |
| +1 | −0.7 | 0.0 | −0.7 | −0.7 | 44.3 | 89.3 | 134.3 |
| A | B | C | D | 4 | 5 | 6 | 7 |
| 0 | 0.0 | 0.0 | 0.0 | 0.0 | 0.0 | 0.0 | 0.0 |
| −1 | −0.7 | 0.0 | −0.7 | 179.3 | 134.3 | 89.3 | 44.3 |
| −2 | −23.4 | 0.0 | −23.4 | −23.4 | −113.4 | 156.6 | 66.6 |
| 3 | −97.8 | 0.0 | −97.8 | 82.2 | −52.8 | 172.2 | 37.2 |
| +4 | −154.3 | 0.0 | −154.3 | −154.3 | 25.7 | −154.3 | 25.7 |
| +3 | −97.8 | 0.0 | −97.8 | 82.2 | −142.8 | −7.8 | 127.2 |
| +2 | −23.4 | 0.0 | −23.4 | −23.4 | 66.6 | 156.6 | −113.4 |
| +1 | −0.7 | 0.0 | −0.7 | 179.3 | −135.7 | −90.7 | −45.7 |

A-Input Mode
B-Calibration Phase (Deg.)
C-Steering Phase (Deg.)
D-Phase Shifter Setting (Deg.)

To isolate an element for test, the calibration phases are all set to zero and the steering phases are set to the same values as the steering phases required to center the pencil beam on the element selected for test. When element no. 8 is thus selected for test, the phase distributions shown in Table II-B result.

TABLE II-B

| | | | | Relative Phase Element No. | | | |
|---|---|---|---|---|---|---|---|
| A | B | C | D | 8 | 1 | 2 | 3 |
| 0 | 0 | 0 | 0 | 0 | 0 | 0 | 0 |
| −1 | 0 | 0 | 0 | 0 | −45 | −90 | −135 |
| −2 | 0 | 0 | 0 | 0 | −90 | 180 | 90 |
| 3 | 0 | 0 | 0 | 0 | −135 | 90 | 45 |
| +4 | 0 | 0 | 0 | 0 | 180 | 0 | 180 |
| +3 | 0 | 0 | 0 | 0 | 135 | −90 | 45 |
| +2 | 0 | 0 | 0 | 0 | 90 | 180 | −90 |
| +1 | 0 | 0 | 0 | 0 | 45 | 90 | 135 |
| A | B | C | D | 4 | 5 | 6 | 7 |
| 0 | 0 | 0 | 0 | 0 | 0 | 0 | 0 |
| −1 | 0 | 0 | 0 | 180 | 135 | 90 | 45 |
| −2 | 0 | 0 | 0 | 0 | −90 | 180 | 90 |
| 3 | 0 | 0 | 0 | 180 | 45 | −90 | 135 |
| +4 | 0 | 0 | 0 | 0 | 180 | 0 | 180 |
| +3 | 0 | 0 | 0 | 180 | −45 | 90 | 135 |

TABLE II-B-continued

| | | | | Relative Phase Element No. | | | |
|---|---|---|---|---|---|---|---|
| +2 | 0 | 0 | 0 | 0 | 90 | 180 | −90 |
| +1 | 0 | 0 | 0 | 180 | −135 | −90 | −45 |

A-Input Mode
B-Calibration Phase (Deg.)
C-Steering Phase (Deg.)
D-Phase Shifter Setting (Deg.)

In Table II-B, the relative phase at element no. 8 is 0° for all input modes while the vector sum of the relative phases of each of the other elements, i.e., element nos. 1- 7, at each of the input modes is zero. A wave impinging upon the array will excite element no. 8 to produce inphase signals at each of the inputs 111-118 of the phase shifters for all of the input modes of the matrix, which signals will combine additively in feed network 110 to appear at input 120 of the network 110. At the same time, excitation by the wave of all the other elements of the array produces signals from those other elements which emerge at the phase shifter inputs with phases such that the signals from all the other elements combine destructively in feed network 110. Thus, only the selected element, element no. 8, is effective in producing signal at the input 120 of feed network !10 when a test signal is transmitted toward the array and phase shifters 101-108 are set as indicated in Tale II-B.

In the second example of the operation of the invention, phase shifters 101-108 are adjusted to steer the beam of the array to 45° in azimuth, i.e., the beam is centered on element no. 1. The resultant phase distributions are shown in Table III-A.

TABLE III-A

| | | | | Relative Phase Element No. | | | |
|---|---|---|---|---|---|---|---|
| A | B | C | D | 8 | 1 | 2 | 3 |
| 0 | 0.0 | 0 | 0.0 | 0.0 | 0.0 | 0.0 | 0.0 |
| −1 | −0.7 | 45 | 44.3 | 44.3 | −0.7 | −45.7 | −90.7 |
| −2 | −23.4 | 90 | 66.6 | 66.6 | −23.4 | −113.4 | 156.6 |
| 3 | −97.8 | 135 | 37.2 | 37.2 | −97.8 | 127.2 | −7.8 |
| +4 | −154.3 | 180 | 26.7 | 26.7 | −154.3 | 25.7 | −154.3 |
| +3 | −97.8 | −135 | 127.2 | 127.2 | −97.8 | 37.2 | 172.2 |
| +2 | −23.4 | −90 | −113.4 | −113.4 | −23.4 | 66.6 | 156.6 |
| +1 | −0.7 | −45 | −45.7 | −45.7 | −0.7 | 44.3 | 89.3 |
| A | B | C | D | 4 | 5 | 6 | 7 |
| 0 | 0.0 | 0 | 0.0 | 0.0 | 0.0 | 0.0 | 0.0 |
| −1 | −0.7 | 45 | 44.3 | −135.7 | 179.3 | 134.3 | 89.3 |
| −2 | −23.4 | 90 | 66.6 | 66.6 | −23.4 | −113.4 | 156.6 |
| 3 | −97.8 | 135 | 37.2 | −142.8 | 82.2 | −52.8 | 172.2 |
| +4 | −154.3 | 180 | 26.7 | 25.7 | −154.3 | 25.7 | −154.3 |
| +3 | −97.8 | −135 | 127.2 | −52.8 | 82.2 | −142.8 | −7.8 |
| +2 | −23.4 | −90 | −113.4 | −113.4 | −23.4 | 66.6 | 156.6 |
| +1 | −0.7 | −45 | −45.7 | 134.3 | 179.3 | −135.7 | −90.7 |

A-Input Mode
B-Calibration Phase (Deg.)
C-Steering Phase (Deg.)
D-Phase Shifter Setting (Deg.)

Following the same procedure as in the first example, element no. 1 is isolated for test by removing all calibration phases and by setting the steering phases to the steering phases required to center the beam on element no. 1. The resultant phases are shown in Table III-B.

TABLE III-B

| | | | | Relative Phase Element No. | | | |
|---|---|---|---|---|---|---|---|
| A | B | C | D | 8 | 1 | 2 | 3 |
| 0 | 0 | 0 | 0 | 0 | 0 | 0 | 0 |
| −1 | 0 | 45 | 45 | 45 | 0 | −45 | −90 |

TABLE III-B-continued

| | | | | Relative Phase Element No. | | | |
|---|---|---|---|---|---|---|---|
| −2 | 0 | 90 | 90 | 90 | 0 | −90 | 180 |
| 3 | 0 | 135 | 135 | 135 | 0 | −135 | 90 |
| +4 | 0 | 180 | 180 | 180 | 0 | 180 | 0 |
| +3 | 0 | −135 | −135 | −135 | 0 | 135 | −90 |
| +2 | 0 | −90 | −90 | −90 | 0 | 90 | 180 |
| +1 | 0 | −45 | −45 | −45 | 0 | 45 | 90 |
| A | B | C | D | 4 | 5 | 6 | 7 |
| 0 | 0 | 0 | 0 | 0 | 0 | 0 | 0 |
| −1 | 0 | 45 | 45 | −135 | 180 | 135 | 90 |
| −2 | 0 | 90 | 90 | 90 | 0 | −90 | 180 |
| 3 | 0 | 135 | 135 | −45 | 180 | 45 | −90 |
| +4 | 0 | 180 | 180 | 180 | 0 | 180 | 0 |
| +3 | 0 | −135 | −135 | 45 | 180 | −45 | 90 |
| +2 | 0 | −90 | −90 | −90 | 0 | 90 | 180 |
| +1 | 0 | −45 | −45 | 135 | 180 | −135 | −90 |

A-Input Mode
B-Calibration Phase (Deg.)
C-Steering Phase (Deg.)
D-Phase Shifter Setting (Deg.)

Table III-B shows that when phase shifters 101–108 are adjusted to isolate element no. 1 for test, the signals from element no. 1 appearing at the inputs 111–118 of phase shifters 101–108 are all in phase and will combine additively in feed network 110 while the vector sum of the signals from each of element nos. 2–8 is zero and these signals will all combine destructively in the feed network.

Figure 4A:
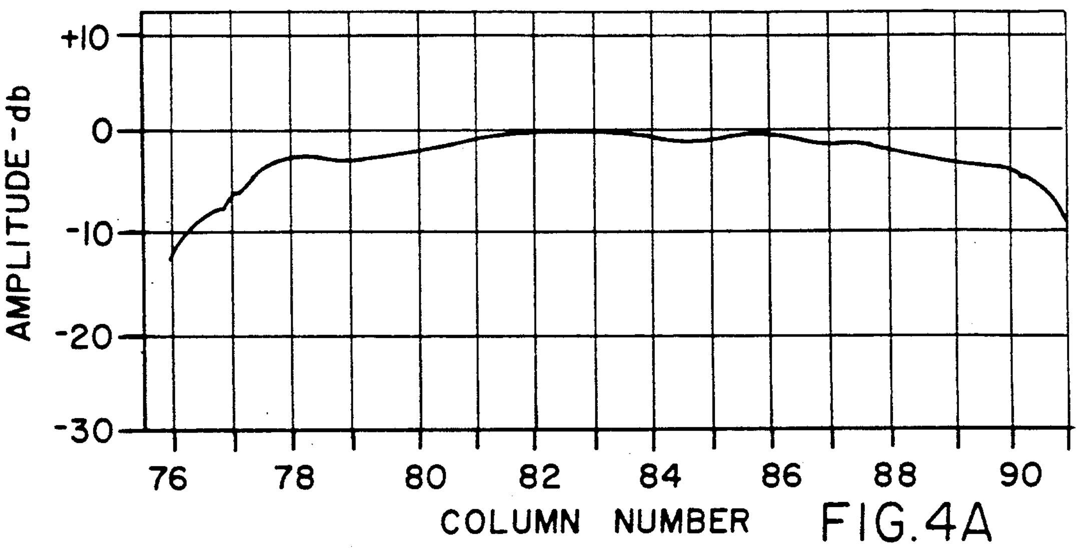
FIG. 4A is a chart showing the results of a test conducted in accordance with the invention on one sector of a Butler matrix fed circular phased array antenna having 128 columns of radiating elements; where the test sector includes sixteen columns, all of which are fully functional.
Figure 4B:
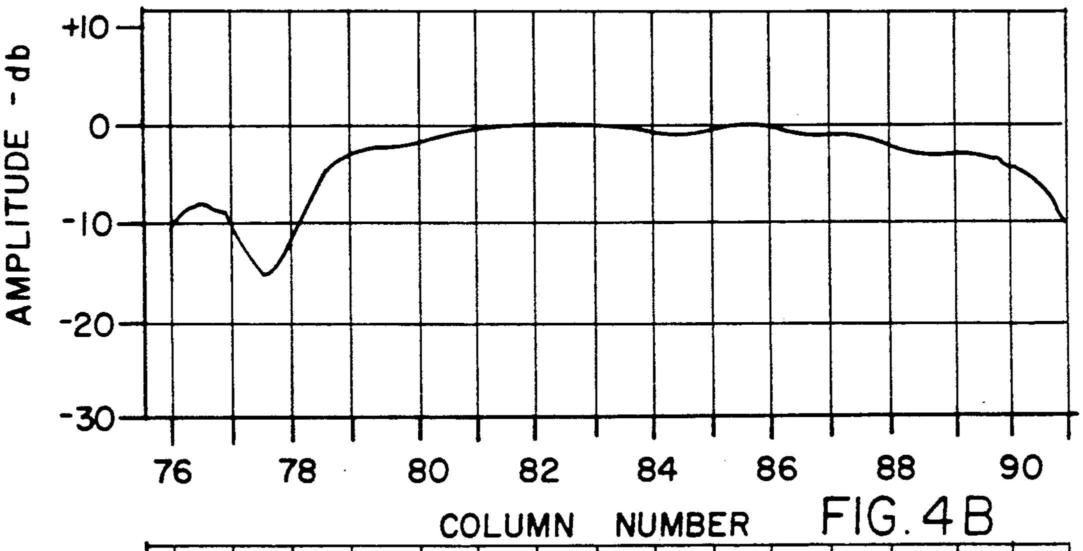
FIG. 4B is a chart, similar to FIG. 4A, showing the test results when column no. 78 within the test sector is disabled.
Figure 4C:
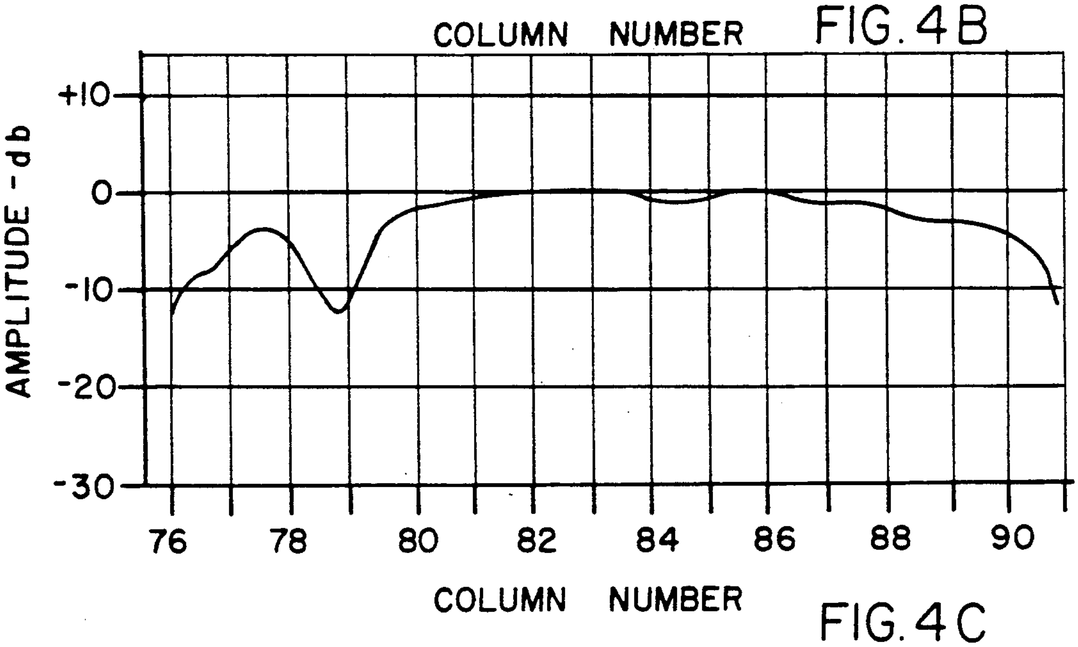
FIG. 4C is a chart, similar to FIG. 4A, showing the test results when column no. 79 within the test sector is disabled.

The principles of operation of the monitoring method of the invention as applied to an eight element circular phased array, described above, apply without change to the specific embodiment of a circular phased array comprised of 128 columns of radiating elements, previously described. FIGS. 4A–4C show the actual results of a test made in accordance with the invention of the 128 column circular array.

FIG. 4A is a plot of the measured amplitude of the output of sum (Σ) receiver 31 of the array shown in FIG. 1 obtained during a monitor cycle. The sector of the array under test is the sector that includes column nos. 76–91. Phase shifters 1–121 are configured for the test by removing all calibration phases therefrom and by setting the phase shifters to the successive sets of values required to steer the array beam through the 512 beam positions located within the test sector. For FIG. 4A, all columns within the test sector are fully functional. The measured values of amplitude appearing in FIG. 4A, correlated with the beam position and column number, are the amplitude values stored in amplitude PROM 66 (FIG. 1).

FIG. 4B is a plot similar to FIG. 4A, except that column no. 78 has been disabled while all the other columns within the sector remain fully functional. Comparing the amplitude at column no. 78 in FIG. 4B with the amplitude at column no. 78 in FIG. 4A, it will be seen that the amplitude in FIG. 4B is approximately 10 db below the amplitude of FIG. 4A. Comparison of the amplitudes in FIGS. 4A and 4B at adjacent column nos. 77 and 79 shows that the FIG. 4B amplitudes for these columns does not depart from the FIG. 4A amplitudes by more than 3 db. Consequently, in the test of FIG. 4B, column no. 78 would be identified as being defective.

FIG. 4C is a plot similar to FIG. 4B, except that column no. 79 has been disabled while all the other columns within the sector remain fully functional. The amplitude at element no. 79 in FIG. 4C is approximately 10 db below the amplitude at element no. 79 in FIG. 4A while the amplitudes at all the other elements in FIG. 4C do not depart more than 3 db from the amplitudes of those elements in FIG. 4A. In the test of FIG. 4C, element no. 79 would be identified as being defective.

Obviously, variations in the method of the invention are possible in the light of the foregoing teachings. It is to be understood that the invention may be practiced otherwise than as specifically disclosed without departing from the spirit and scope of the appended claims.

The invention claimed is:

1. The method of fault isolation in a Butler matrix fed phased array antenna, said antenna including:

a plurality of radiating elements arranged in an array;
a Butler beam forming matrix connected to said radiating elements; a plurality of variable phase shifters connected to said Butler matrix, and a distribution network for distributing energy to said radiating elements of said array, said network having an input port and a plurality of output ports, each said network output port being connected to a separate one of said phase shifters;

said method comprising:

adjusting said phase shifters to values so that only a selected first one of said radiating elements of said array is effective in delivering energy to said input port of said distribution network;

transmitting a test signal toward said array;

measuring the amplitude of the signal at said input port of said distribution network to provide a measured amplitude;

identifying said selected first radiating element as being defective whenever said measured amplitude is below a predetermined level.

2. A method as claimed in claim 1 with the additional steps of:

adjusting said phase shifters to values so that only a selected second one of said radiating elements of said array is effective in delivering energy to said input port of said distribution network;

repeating said steps of:

transmitting; measuring; and identifying for said second one of said radiating elements.

3. The method of fault isolation in a Butler matrix fed phased array antenna, said antenna including:

a plurality of radiating elements arranged in an array;
a Butler beam forming matrix connected to said radiating elements; a plurality of variable phase shifters connected to said Butler matrix; and a distribution network for distributing energy to said radiating elements of said array, said network having an input port and a plurality of output ports each said network output port being connected to a separate one of said phase shifters;

said method comprising a routine including the steps of:

adjusting said phase shifters to values so that only a selected one of said radiating elements of said array is effective in delivering energy to said input port of said distribution network;

transmitting a test signal toward said array;

detecting said test signal received by said array and delivered to said input port of said distribution network;

measuring the amplitude of said detected signal to provide a measured amplitude;

identifying said selected radiating element as being defective whenever said measured amplitude is below a predetermined level;

repeating said routine for successively different selected ones of said radiating elements of said array until all said radiating elements of said array have been tested.

4. The method of fault isolation in a Butler matrix fed phased array antenna, said antenna including:

a plurality of radiating elements arranged in an array; a Butler beam forming matrix connected to said radiating elements; a plurality of variable phase shifters connected to said Butler matrix; and a distribution network for distributing energy to said radiating elements of said array, said network having an input port and a plurality of output ports, each said network output port being connected to a separate one of said phase shifters;

said method comprising;

performing a first routine when all said radiating elements of said array are known to be fully functional, said first routine including the steps of:

adjusting said phase shifters to values so that only a selected one of said radiating elements of said array is effective in delivering energy to said input port of said distribution network;

transmitting a test signal toward said array;

detecting said test signal received by said array and delivered to said input port of said distribution network;

measuring the amplitude of said detected signal to provide a reference measured amplitude;

storing said reference measured amplitude correlated with said selected radiating element;

repeating said first routine for successively different ones of said radiating elements until said reference measured amplitudes for all said radiating elements of said array have been stored;

performing a second routine when the functionality of said radiating elements of said array is to be tested, said second routine including the steps of:

adjusting said phase shifters to values so that only a selected one of said radiating elements of said array is effective in delivering energy to said input port of said distribution network;

transmitting a test signal toward said array;

detecting said test signal received by said array and delivered to said input port of said distribution network;

measuring the amplitude of said detected signal to provide a test measured amplitude;

comparing said test measured amplitude with said stored reference measured amplitude; and identifying said selected radiating element as being faulty whenever said test measured amplitude is less than a tolerable amount below said stored reference measured amplitude for said selected radiating element;

repeating said second routine for successively different ones of said radiating elements until all said radiating elements of said array have been tested by said second routine.

5. The method of fault isolation in a Butler matrix fed phased array antenna system, said antenna system including:

a Butler matrix having a plurality of input modes and a plurality of output ports;

a plurality of radiating elements, one each of said radiating elements being connected to one each of said matrix output ports;

a plurality of variable phase shifters, one each of said phase shifters being connected to one each of said matrix input modes;

a power divider having an input port and a plurality of output ports, one each of said power divider output ports being connected to one each of said phase shifters;

a transmitter;

a receiver;

means for connecting said transmitter and said receiver to said power divider input port;

means for adjusting said phase shifters to apply calibration phases to said Butler matrix for shaping the beam formed by said antenna; and means for ad3usting said phase shifters to apply steering phases to said Butler matrix for steering the beam formed by said antenna;

said method comprising:

adjusting said phase shifters to remove all calibration phases from said Butler matrix;

adjusting said phase shifters to apply phases to said Butler matrix corresponding to the phases applied to said Butler matrix when steering the beam of said antenna in a direction aligned with a first one of said radiating elements of said array;

transmitting a test signal toward said antenna;

recording and storing the amplitude of the output of said receiver when said first one of said radiating elements is known to be fully functional to provide a reference amplitude for said first radiating element;

repeating said steps adjusting said phase shifters to phases corresponding to steering phases, transmitting a test signal, and recording and storing the amplitude for each successive one of said radiating elements when said successive ones of radiating elements are known to be fully functional, until said reference amplitudes are stored for each said radiating element of said array;

thereafter, testing said radiating elements of said array to determine the functionality of each of said radiating elements by performing for each of said radiating elements said steps of:

adjusting said phase shifters to remove all calibration phases, adjusting said phase shifters to phases corresponding to steering phase, and transmitting a test signal;

comparing the amplitude of the output of said receiver obtained during a current test for each said radiating element with said stored reference amplitude for each said radiating element; and identifying a radiating element as being faulty whenever said comparison shows the current amplitude to be less than a tolerable amount below said reference amplitude.

* * * * *